(12) United States Patent
Ortiz et al.

(10) Patent No.: US 7,712,665 B2
(45) Date of Patent: May 11, 2010

(54) IDENTIFYING PRODUCTS

(75) Inventors: Lester Ortiz, Camuy, PR (US); Steven John Simske, Fort Collins, CO (US); Malena Mesarina, Mountain View, CA (US); Vinay Deolalikar, Mountain View, CA (US); Cyril Brignone, Mountain View, CA (US); Guillaume Oget, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 11/129,449

(22) Filed: May 12, 2005

(65) Prior Publication Data

US 2006/0255132 A1 Nov. 16, 2006

(51) Int. Cl.
*G06K 5/04* (2006.01)
*G06K 7/10* (2006.01)
*G06K 9/00* (2006.01)
(52) U.S. Cl. ............................. 235/462.12; 235/462.04
(58) Field of Classification Search .................. 235/380, 235/462.01, 462.12, 462.45, 462.04
See application file for complete search history.

(56) References Cited

U.S. PATENT DOCUMENTS

| | | | | |
|---|---|---|---|---|
| 3,826,222 A * | 7/1974 | Romick | ...................... | 206/534 |
| 4,847,474 A * | 7/1989 | Engel et al. | ............. | 235/462.14 |
| 4,976,351 A * | 12/1990 | Mangini et al. | ............. | 206/232 |
| 5,768,384 A * | 6/1998 | Berson | ........................ | 705/50 |
| 6,371,375 B1 * | 4/2002 | Ackley et al. | ........... | 235/462.45 |
| 6,543,692 B1 * | 4/2003 | Nellhaus et al. | ........ | 235/462.01 |
| 2005/0029355 A1 * | 2/2005 | Sali et al. | ............... | 235/462.04 |

\* cited by examiner

*Primary Examiner*—Kumiko C Koyama

(57) ABSTRACT

A method of identifying a product includes generating a code unique to the product, said code being provided by a multitude of individual identifiers, applying the multitude of the identifiers of the code to the packaging of the product as a pattern to identify the product. The method also involves applying a sub-set of two or more of the multitude of the identifiers of said code to the product, said sub-set of the multitude of the identifiers of the code being applied so they will be presented in the same pattern order as they appear in the pattern order of the multitude of the identifiers of the code applied to the packaging. The product can be identified with a reasonable likelihood of being a genuine product by determining that a presented pattern order of the sub-set of the multitude of the identifiers applied to the product corresponds to a presented pattern order within the multitude of the identifiers applied to the packaging.

26 Claims, 6 Drawing Sheets

IDENTIFYING PRODUCTS

FIELD OF THE INVENTION

The disclosure relates generally to the identification of products and particularly to a method and system for identifying pharmaceutical products.

BACKGROUND

Hitherto, it has been known to provide barcodes or other codes to products to enable the identification thereof. Typically, a consumer will read the code and check the code against a source of codes to determine the nature of the product. This may or may not unequivocally signify a genuine product. Counterfeit products can usually be detected by either the absence of the code applied to the products or an incorrect code applied to the products.

In the pharmaceutical industry there is a particular problem with the existence of non genuine products and more particularly so with modern advertising media such as the Internet. The Internet, is a communications medium whereby counterfeiters can cheaply and anonymously advertise non genuine products, such as pharmaceutical products, with the intention to sell those products as genuine products. An unsuspecting consumer is attracted to the products because of the low price compared to the original genuine products. In the case of non genuine pharmaceutical products, there is also a concern for the well being of the consumer if the non genuine products have little or no pharmaceutical benefit because they are made from inappropriate materials. Thus, there is not only the problem for the genuine product manufacturer with counterfeit products, but there is also the well being problem for the consumer.

To date, there is no known mechanism whereby a product can be readily checked in a reasonably reliable manner to determine if it is probable that it is a genuine product. Thus, it would be desirable to provide a mechanism whereby products can be checked to attempt to verify the likelihood of their authenticity, and where such mechanism is more reliable than known mechanisms.

SUMMARY

In one embodiment there is provided a method of identifying a product. The method involves generating a code unique to the product, the code being provided by a multitude of individual identifiers, applying the multitude of the identifiers of the code to the packaging of the product as a pattern to identify the product. The method also involves applying a sub-set of two or more of the multitude of the identifiers of the code to the product, the sub-set of the multitude of the identifiers of the code being applied so they will be presented in the same pattern order as they appear in the pattern order of the multitude of the identifiers of the code applied to the packaging. The product can be identified with a reasonable likelihood of being a genuine product by determining that a presented pattern order of the sub-set of the multitude of the identifiers applied to the product corresponds to a presented pattern order within the multitude of the identifiers applied to the packaging.

BRIEF DESCRIPTION OF THE DRAWINGS

Objects, features and advantages will become apparent by reference to the following detailed description and drawings of examples.

DETAILED DESCRIPTION

Embodiments of the disclosure are directed to pharmaceutical products such as tablets, capsules, vials, dosages, or the like pharmaceutical products. Clearly, the inventive concepts are applicable to identification of products of any category and should not be limited to the pharmaceutical field exclusively.

Figure 1:
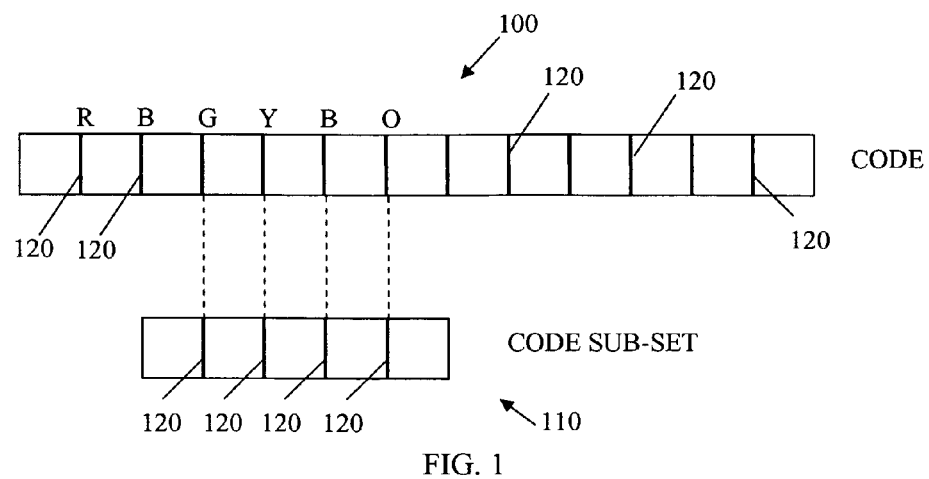
FIG. 1 is a schematic diagram showing the application of a code unique to the product in accordance with an embodiment of the present invention.

Referring now to FIG. 1, there is shown a code 100 that is applied to the packing of the product and used to identify the product that is packaged. FIG. 1 also shows a sub-set of the code 110 that is applied to the product. The code 100 that is applied to the packaging of the product is made up of a multitude of individual identifiers 120. Typically, a manufacturer of products will generate a complex code 100 to apply to packaging of the product. Thus, the manufacturer may elect to have a large number of individual identifiers 120.

In one example, the code may be a bar code arrangement where there are different colors for each of the individual bars. In this arrangement, the individual bars and the pattern order of the colors will indicate a code which can be related to the particular packaged product. If the code 100 has thirteen stripes and 9 possible colors, then there are $10^{12}$ possible code patterns. If $10^6$ of those $10^{12}$ are assigned to be genuine possibilities for the product, then a specific color pattern has only one in a million chance of being a valid code pattern and therefore representing a genuine product.

In the example shown in FIG. 1, each of the identifiers 120 (bars) is of the same width and height and is spaced apart an equal distance from a next adjacent identifier 120. The colors utilised may be readily visually differentiatable from one another such as red, blue, green, yellow, orange, black, white, khaki etc.

The sub-set of code 110 that is applied to the product is a small portion of the code 100 but wherein the individual identifiers 120 are applied in the same pattern order as in the code 100. In other words, looking at the code 100, from the left hand end, the bar identifiers 120 are red, blue, green, yellow, black and orange etc. The sub-set of code 110 may therefore commence at the blue bar identifier and proceed to the right hand end in the same pattern order. Thus, the sub-set of code 110 applied to the product can be two or more of the identifiers in a multitude of identifiers defining the code 100. Typically, four or more identifiers are provided in the sub-set of code 110 but this number is not to be considered as limiting in any way. Assuming that the sub-set of code 110 applied to the product is four individual identifiers 120 in length, then if the sub-set of code 110 commences at the blue identifier 120 in the code 100 applied to the packaging of the product, then the pattern order for the sub-set of code 110 is blue, green, yellow, and black.

In order to verify that the packaged product is genuine, a user can read the code 110 applied to the product, and compare the code 110 with the code on the packaging of the product to determine if there is correspondence in the pattern order appearing in the code 100. If there is correspondence then the user is able to assume that the packaged product is a product that has been packaged by the manufacturer. The user is also able to assume that the manufacturer is the genuine product manufacturer.

The code 100 that is applied to the packaging of the product may be generated, from base data, for example, a barcode number, a serial number, a SKU/product number, a lot number and the like base data. The exact base data from which the code is generated can be held as proprietary information and maintained confidential.

Figure 2:
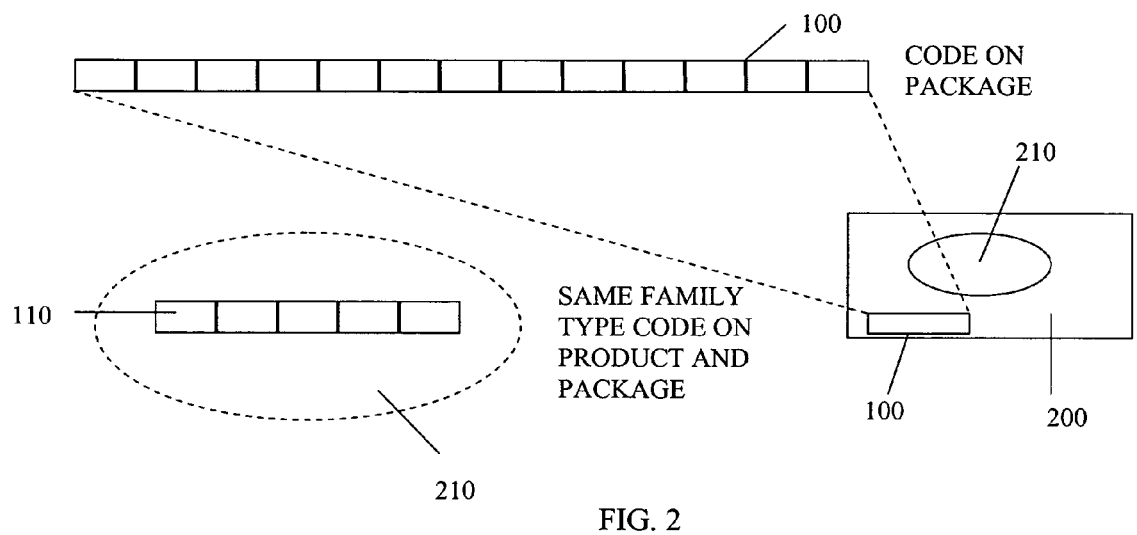
FIG. 2 is a schematic diagram showing a product having a sub-set of a code applied thereto and a package in which the product is presented to a consumer in accordance with an embodiment of the present invention.

FIG. 2 shows packaging 200 containing a product 14. The product is shown enlarged relative to the packaging for aid of clarity. The exact shape and configuration of the packaging is not fundamental to the inventive concepts and may assume any known packaging configuration. FIG. 2 shows a rectangular packaging of a blister pack type having a single product packaged. The code 100 which is applied to the packaging is applied at a convenient side location of the packaging. The sub-set of code 110 applied to the product is applied across a face of the product 14. Typically, the sizing of the individual identifiers 120 and the spacing apart of the identifiers 120 is the same on the sub-set of code 110 applied to the product 14 as the code applied to the packaging 100. In use, a consumer can remove the product 14 from the packaging 200 and physically align the sub-set of code 110 applied to the product 14 against the code 100 applied to the packaging. In this way, there can be lateral side to side movement of the product 14 relative to the packaging 200 to effect alignment or correspondence of the sub-set of code 110 with the code 100 to determine if there is a same pattern order of the identifiers 120.

Figure 3:
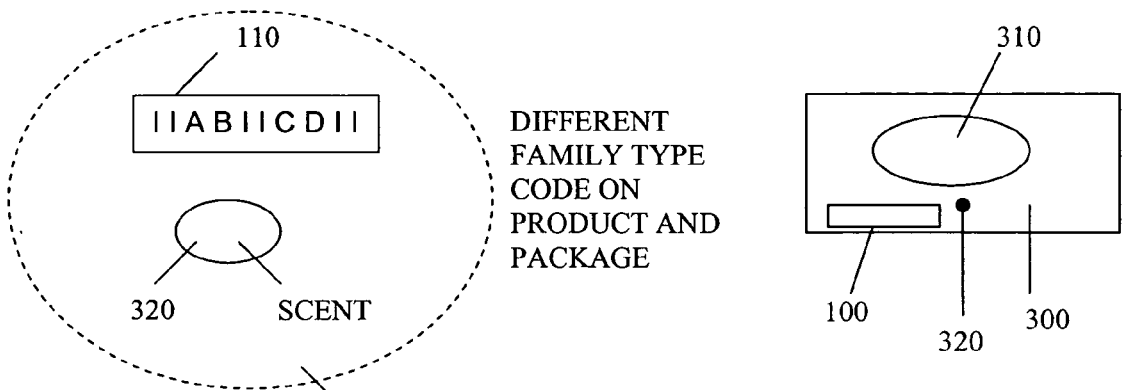
FIG. 3 is a view similar to that of FIG. 2 but showing an arrangement of code which includes different family type identifiers in the code applied to both the product and the packaging in accordance with an embodiment of the present invention.

The individual identifiers 120 have been shown in FIGS. 1 and 2 as being bars. The individual identifiers 120 may be of any desired shape or even patterns or symbols. Further, in the examples of FIGS. 1 and 2, the individual identifiers 120 are all of the same family type between the code 100 on the packaged product and the sub-set of code 110 applied to the product. Such an arrangement represents one example only. Another example is shown in FIG. 3 where the code 100 applied to the packaging is of multiple family types. In this case, there is a combination of bars as individual identifiers 120, and alphabetic characters as identifiers 120. It can be seen in this arrangement, that there is a pattern order for the code 100 and the sub-set of code 110. In FIG. 3, the full sequence of the identifiers defining the pattern has not been shown in order to aid clarity. The product 310 has been shown with a particular pattern order of a sub-set of code 110 having both bar identifiers 120 and alphabetic identifiers 120. In addition to the above, a further identifier 320 is applied to the product and to the packaging to enhance security. In this arrangement, the identifier 320 is a scent identifier.

In this arrangement, a consumer would remove the product 310 from the packaging 300 and check the correspondence of the sub-set of code 110 against the code 100. The user would also check that the scent of the product 310 corresponds with the scent 320 on the packaging 300.

The product in the pharmaceutical environment is typically physically of size insufficient to carry all of the identifiers 120 in the code 100 applied to the packaging in the same size and positioning pattern as on the packaging. Thus, the techniques outlined herein are beneficial for permitting a user to determine the reasonable likelihood of the product being a genuine product without having to have all of the identifiers 120 in the code on the packaging actually applied to the product.

In the above embodiments, a single product 210, 310 is shown in a single packaging 200, 300. Typically, pharmaceutical products are packaged with multiple products 210 in packaging 200. Usually, the products 210 are packaged in rows and the rows usually have aligned columns. If desired, the sequence order of the identifiers 120 applied to the products 210 in a row or column or both may correspond exactly with the sequence or pattern order of the identifiers 120 on the packaging 200. For example, if the code 100 on the packaging has 12 identifiers 120, and there are three products packaged in a row, then each product may have four identifiers 120 in the sequence or pattern order. The first product 210 may have its code identifiers 120 start at the first identifier 120 in the code 100 on the packaging, and the next product would therefore have its first identifier 120 start at the fifth identifier 120 on the packaging, and the third product have its first identifier 120 start at the eleventh identifier 120 on the packaging. A consumer can readily identify the likelihood of the packaged products 210 being genuine products by noting the full code sequence across the multiple products 210 in a particular row or column or both and noting that the pattern order of the identifiers correspond with the pattern order of the identifiers 120 applied to the packaging. Whilst FIG. 3 shows barcode identifiers 120 and alphabetic identifiers 120 and a scent identifier 15 these are not to be taken as exhaustive examples of different family types of identifiers that can be utilised.

The code 100 that is applied to the packaged product can be generated in various ways, for example, by data representing the plant where the product is made. If desired this data can be used in combination with other data items about the product. For example, data about a particular day of production, the particular apparatus that produced the product, the supplier of the base ingredients, and these may all be utilised to generate a code 100. In addition, encryption techniques may be utilised to further modify the data within a generated code so that the code 100 applied to the packaging may be an encrypted version of the data in the code itself.

In that way, proprietary information about the product may be maintained secret whilst not impairing the basic code 100 presentation technique and the sub-code 110 technique disclosed herein. Furthermore, it may be possible to provide particular indicators 120 at discreet locations in the pattern of the code 120 to identify certain parameters associated with the product. For example, every fifth indicator may be a particular indicator to indicate a batch number of the product and a further particular indicator 120 utilised to indicate a date of manufacture or some other characteristic. Thus, the code 100 applied to the packaging of the product may have indicators 120 which are not intended to be utilised primarily as a code matching pattern part of the sub-set of code 110. In such an arrangement, only the manufacturer of the product will know which particular indicators 120 are the indicators that indicate the characteristics of the product, and which are not to be considered as the actual code in the sub-set of the code 110 applied to the package.

The code 100 and the sub-set of the code 110 can be applied to a membrane or like backing such as paper or the like which is subsequently adhered to the packaging 200,300 and/or the product 210,310 in a convenient manner. The ink and the backing can be chosen to be non toxic to the consumer if ingested or otherwise administered. The ink may also be chosen to have a reasonable color retention characteristic overtime, and desirably for the life of a "use by" date of the product. Further, the ink may also be chosen so that it will be unlikely to be accidentally "rubbed off" the product. The code 100 and the sub-set of the code 110 may be printed directly on the packaging 200,300 and the product 210,310. Suitable printers may be provided in the production stream of the product and the packing, for printing the particular code 100 or the sub-set of code 110 so they can be used directly to the packaging and the product in the production stream. Such printers are considered to be proprietary printers developed specifically for a production process. Thus, in this arrangement, persons wishing to make non-genuine products have a further hurdle to cross if they are to attempt to produce "fake" codes 100 and sub-set of the code 110. In the case of applying a scent 320 to the packaging 200,300 and the product 210, 310, this can be applied by a similar printing process to the process that prints the code 100 or the sub-set of code 110.

In addition to providing identifiers 120,320 in the form of readily visually identifiable or smell identifiable identifiers, the identifiers may be provided by Braille or Braille-like patterns. Further, since products such as pills for example, can be readily shaped to a desired shape during their formation process from powder, the surface of the product may be provided with tactile feel surfaces such as ruffled, smooth, waffled, scratchy, and the like. Thus, the identifiers 120 that are printed on the packaging can be formed by any one or more of these particular types of identifiers and a corresponding sub-set of the identifiers in the same pattern order can be applied to the products 210,310. In this way, persons who are able to interface using tactile feel/touch procedures will be able to identify the particular identifiers and compare the identifiers on the product 210,310 with the identifiers on the packaging 210,310 to determine if there is a match or correspondence. The identifiers on the packaging may be applied in a similar way by embossing, molding or otherwise applying a similar pattern thereto.

Figure 4:
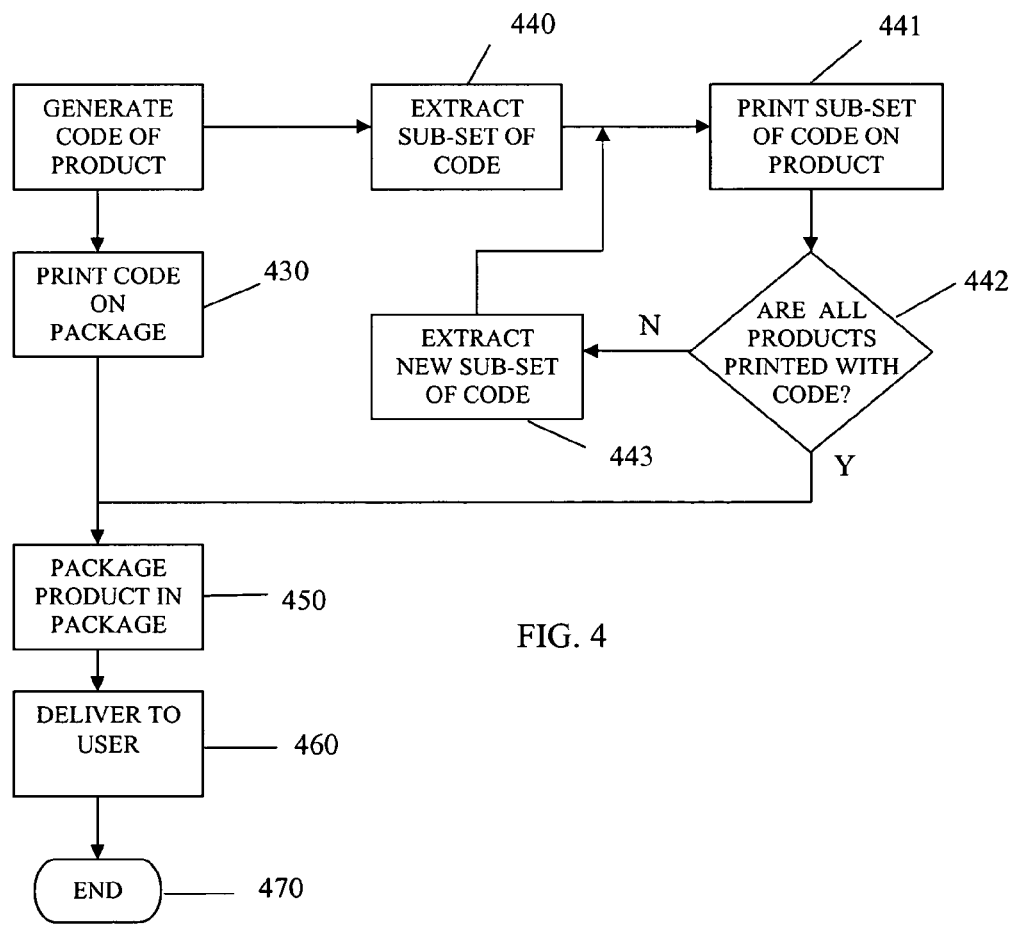
FIG. 4 is a functional flow diagram showing process steps in generating a code and applying that code both to the package and the product in accordance with an embodiment of the present invention.

Referring now to FIG. 4 there is shown a functional flow diagram of the processes involved in generating a code 100 and applying a sub-set of the code 110 to the packaging 200,300 and the product 210,310 respectively. FIG. 4 assumes that the packaging 200,300 for the product is supplied on a production line together with product 210,310 to be packaged. At the start of the process, a code identifying the packaged product 100 is generated 420 by a software component. This code can be generated according to any of the non exhaustive principles previously outlined. In a first process stream the code 100 is printed onto the package of the product. In a second process stream, the sub-set of code 110 to be applied to the package is extracted 440. The sub-set of code 110 is then applied 441 to the product. As stated previously, the printing 441 of the code 100 and the sub-set of code 110 may be directly onto the packaging and/or the product or onto other membranes or the like backings which are then applied to the packaging and the product.

If multiple products within a multi product packaging are to be provided with a different sub-set of code 110 to make it even more difficult for counterfeiters to produce non-genuine goods with appropriate markings, the method involves determining 442 if all the products for the package have been printed with a code. If the answer is "no", a new subset of code is generated 443 which is then printed 441 on the next product to be packaged. This process repeats until the necessary number of products for the packaging have been obtained. If the answer is "yes", the products are packaged at step 450 and delivered to the user at step 460 after which the process ends 470.

Figure 5:
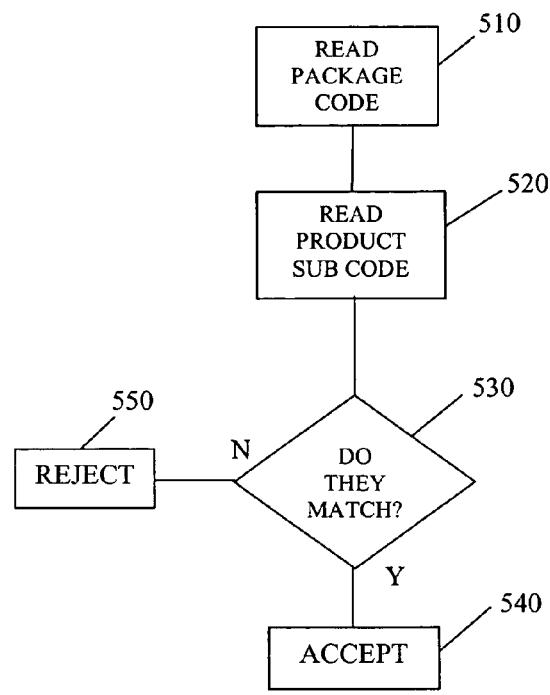
FIG. 5 is a further functional flow diagram showing processes involved in checking that the packaged product is likely to be a genuine product in accordance with an embodiment of the present invention.

Referring now to FIG. 5 there is shown a basic functional flow diagram of the processes involved for determining if the packaged product is, in fact, reasonably likely to be a genuine packaged product. The process starts 500 by the user reading 520 the code 100 identifying the packaged product, and also the user reading 530 the sub-set of code 110 that is applied to the product. The user then compares the two codes for a pattern match. If there is a match, the user accepts 540 the product as genuine if the codes do not match the user rejects 550 the products as non-genuine.

Figure 6:
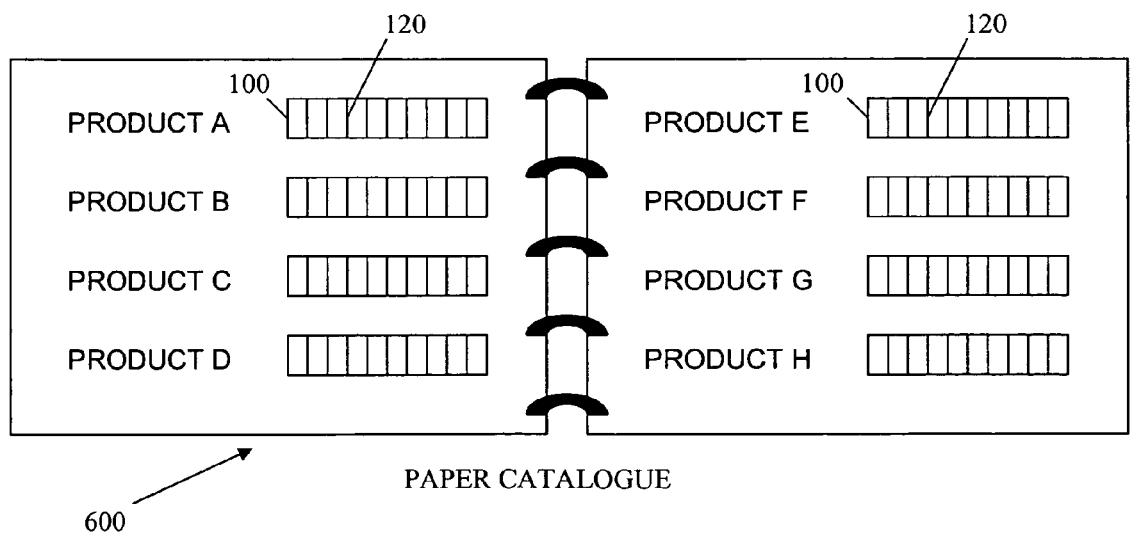
FIG. 6 is a schematic diagram showing a catalogue having different products therein with respective codes in accordance with an embodiment of the present invention.

Referring now to FIG. 6 there is shown a catalogue 660 which may be provided for access by pharmacists or other interested persons including members of the public. Typically, the catalogue 600 is produced by the manufacturer of the genuine product or a Government or like authority. The catalogue 600 is shown in FIG. 6 as being a multi paged document. The catalogue may be an electronic catalogue in a suitable database. Any other type of cataloguing may be utilised. In this arrangement, the manufacturer's products are shown listed as product a, product b, product c, product h . . . . Associated with each of the products are the particular code 100 represented by the individual identifiers 120. This therefore provides an official catalogue record of the particular code 100 that is applied to the packaging for each of the respective products of the manufacturer.

This enables a user to confirm that the pattern order of the multitude of identifiers 120 of the code on the packaging correspond with the pattern order of the multitude of the identifiers of that code in the catalogue for that product, and is therefore the same code. This signifies that the packaging code on the product itself is therefore a correct code for the product. This permits a user to determine from the code 100 if the packaged product is, in fact, reasonably likely to be a product that is desired by the user. It also enables the user to check that this is, in fact, reasonably likely to be a genuine product of the manufacturer.

Figure 7:
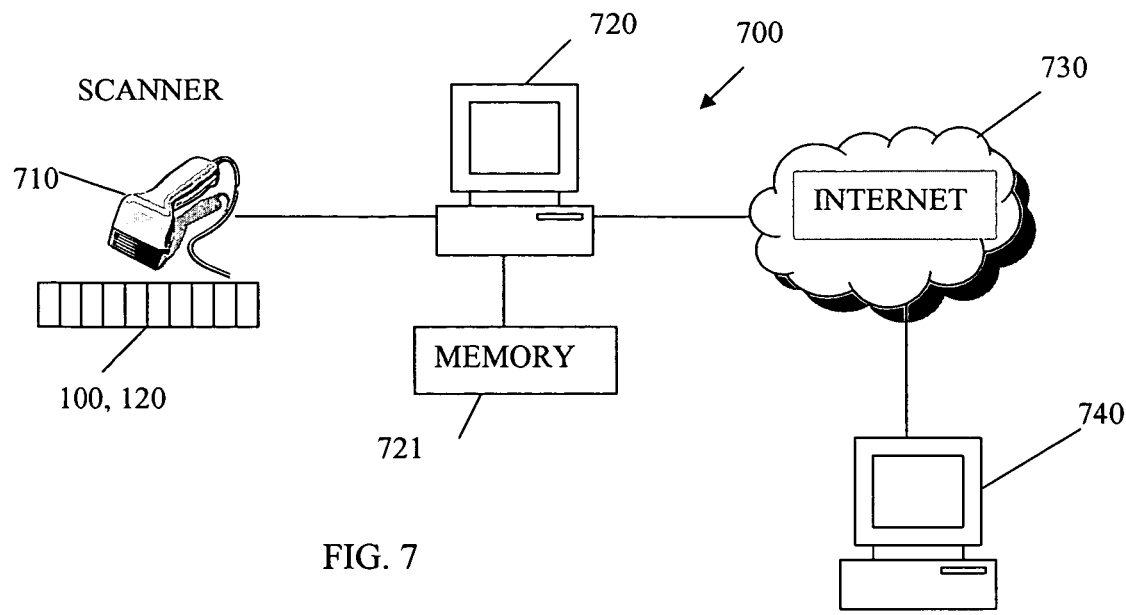
FIG. 7 is a schematic diagram showing scanning of code applied to a package to check that the code on the package is a code applied by a manufacturer of the product in accordance with an embodiment of the present invention.

Referring now to FIG. 7 there is shown a block schematic arrangement of a system for necessary comparison can be made utilising an electronic database catalogue of the manufacturer's products and stored code 100. Here, a user scans the code 100 on the packaging using a suitable scanner 710 that is electrically connected with a computer device 720 such as a PC. The computer device 720 has within its memory 721 for storing the scanned code 100. The computer also has a facility to connect to the Internet 730 to access a computerised database 740 at a remote site where the catalogue can be accessed.

Accordingly, the code 100 can be read as a data package and transmitted from the computer device 720 through the Internet 730 to the computer database 740 where there can be "matching" processes invoked to enable the user to determine if the code 100 is, in fact, one of the manufacturer's codes in the catalogue. Thus, the computerised database 740 is accessible at a website maintained by a suitable server device, as is known in the electronic arts. When the website is accessed and the code 100 input into the database, a background process can be invoked to enable the input code 100 to be checked for the same pattern order as in the database. This runs a suitable routine and enables the package description/name of the product to be provided to the user.

Figure 8:
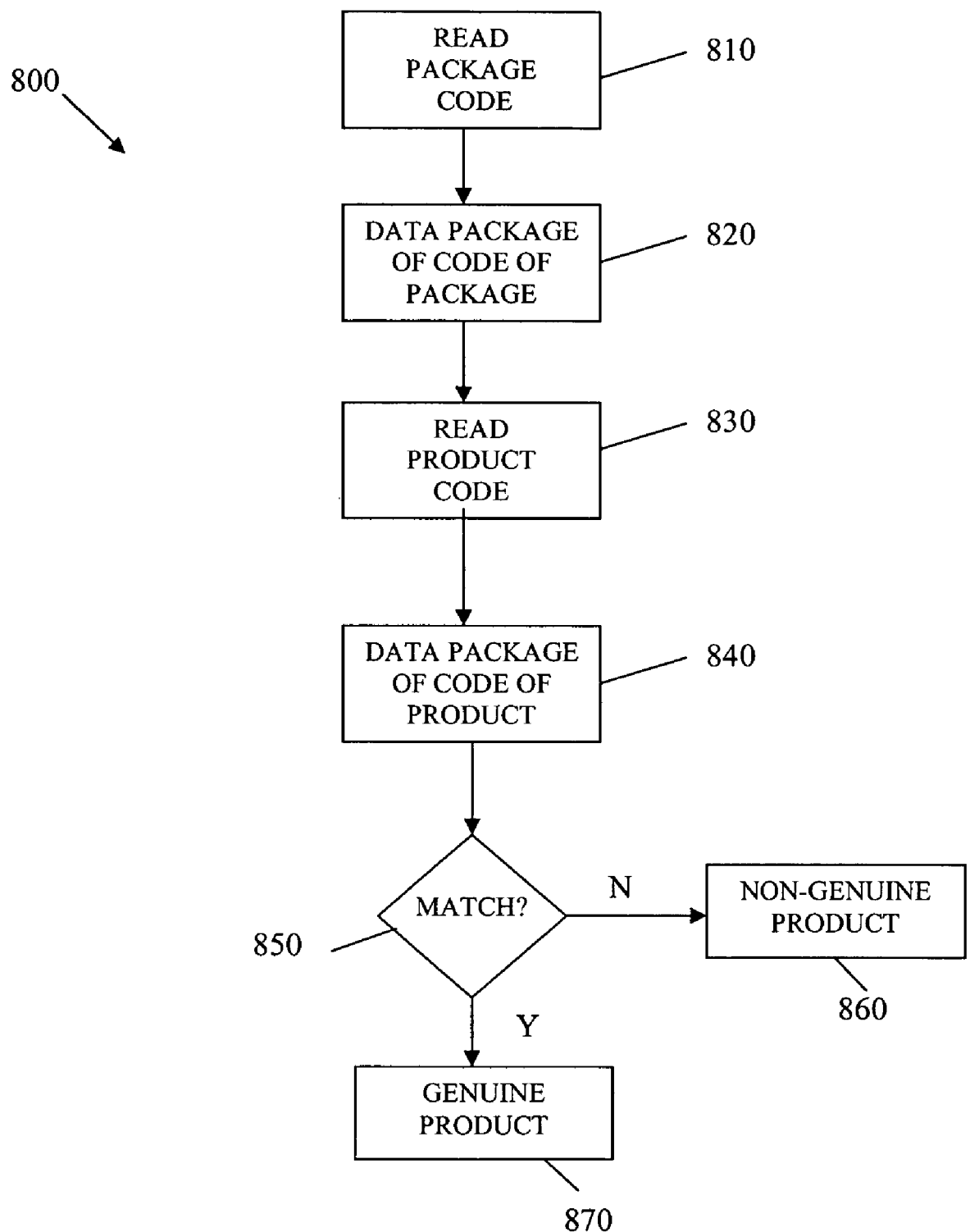
FIG. 8 is a functional flow diagram showing process steps in comparing the code on a packaging with the code on the product (or vice versa) to determine if the product is likely to be a genuine product in accordance with an embodiment of the present invention.

FIG. 8 is a functional flow diagram that shows an software process 800 for comparing the subset of code 110 read from the product 210,310 against the code 100 identifying the packaged product. Here, a similar scanner device 710 to that shown in FIG. 7 is utilised with an appropriate computer device 720. The computer device 720 has software therein that permits the sub-set of code 110 applied to the product to be read 810 to obtain 820 a data package and fed to a comparator device within the software. Similarly, the code 100 identifying the packaged product is read 830 to obtain 840 and a data package. Both data packages are provided to the comparator within the software. The comparator then determines if there is a match 850 of the pattern order of the sub-set of code 110 within the code 100 identifying the packaged product. If there is a match a user can be informed that it is a genuine product 860, and if there is no match the user can be informed that the product is a non-genuine product 870.

Figure 9:
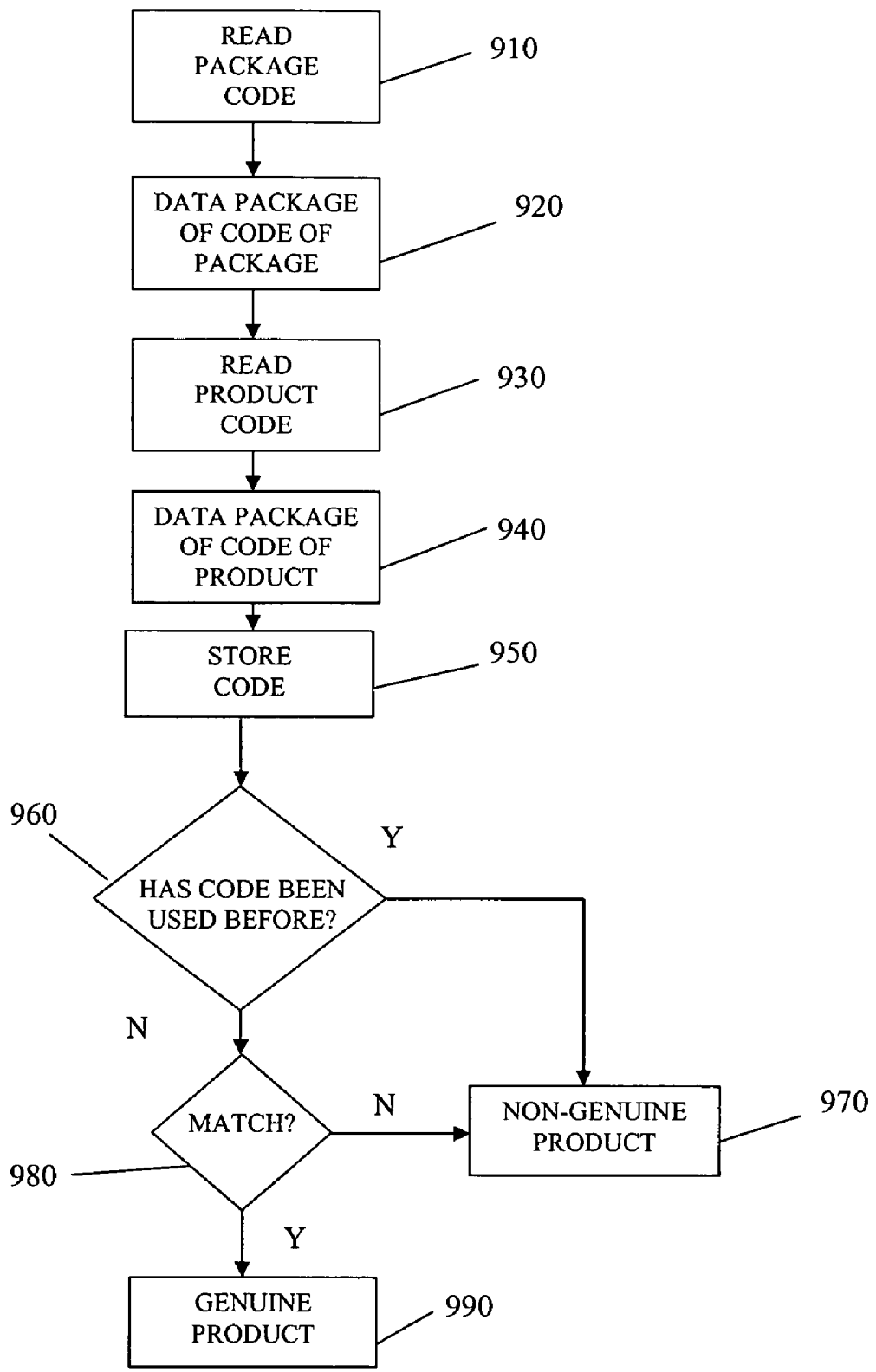
FIG. 9 is a functional flow diagram showing storing each attempt of checking a sub-set of the code in a database, and informing a user who is attempting to make a subsequent check of the sub-code, if that same sub-code has being previously checked in the database in accordance with an embodiment of the present invention.

FIG. 9 is a functional flow diagram similar to that of FIG. 8 but including an additional functional component that enable the software to determine if the sub-set of code 110 applied to the product has previously been attempted to be checked. Process steps 910, 920, 930 and 940 are equivalent to process steps 810, 820, 830 and 840 shown in FIG. 8 but there is an additional process of storing the product code 950. A comparison 960 is then made as to whether the code has been used before. If the code has been used before the user is informed of the possibility of a non-genuine product 970. If the code has not been used, then a comparison 980 is made with the code 100 read from the package and the user then informed it is likely to be a genuine product 990, or a non-genuine product 970 (assuming there is no pattern match).

Figure 10:
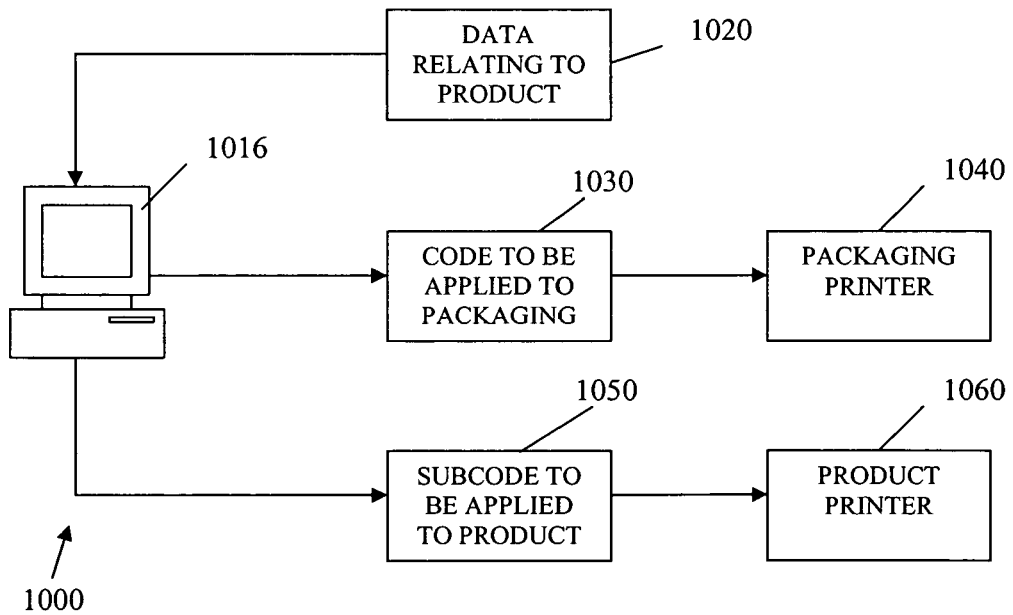
FIG. 10 is a schematic diagram showing a system for applying a code to a packaging and for applying a subcode to a product, in accordance with an embodiment of the present invention.

Referring now to FIG. 10 there is shown a system 100 that includes a computer device 1010, such as a PC, that compiles a code 100 to be applied to the packaging and also a sub-code 110 to be applied to the product. Here, the computer device 1010 has a database containing 1020 data relating to the product. This data may be place of manufacture, date of manufacture, batch number, plant number, machine number or the like. It can contain other proprietary information that the manufacturer wishes to embed into the code 100 that is applied to the packaged product. Thus, the computer device 1010 has resident software to compile the necessary code 100 from that data. An electronic data signal package 1030 is output from the computer 1010 representing the code 100 to be applied to the packaging so this data signal package is presented as a printing signal to a packaging printer 1040.

The computer 1010 also provides a data signal package 1050 representing the sub-code 110 to be applied to the product. This produces a printing signal to a product printer 1060. The packaging printer 1040 and the product printer 1060 may be employed in a process assembly line where the products are introduced into the packaging and the packaging sealed for subsequent distribution. Each of the packaging printer 1040 and the product printer 1060 may be dedicated purpose built printers for the particular packaging and/or the products to be packaged. The printers 1040 and 1060 may be combined as a single printer depending on the process assembly line configuration. In the case of pharmaceutical products such as tablets, the printer 1060 can be configured to enable printing directly onto the surface of the pharmaceutical product or onto a substrate which is, in turn, then applied to the surface of the pharmaceutical product.

While several embodiments have been described in detail, it will be apparent to those skilled in the art that the disclosed embodiments may be modified. Therefore, the foregoing description is to be considered exemplary rather than limiting.

The invention claimed is:

1. A method of identifying an ingestible product, the method comprising:

generating a code unique to the ingestible product, the code being provided by a multitude of individual different color bar identifiers;

applying a first pattern to a packaging, wherein the first pattern comprises the multitude of the different color bar identifiers of the code arranged in a sequence;

applying a second pattern directly to the ingestible product, wherein the second pattern comprises a sub-set of two or more of the respective different color bar identifiers of the sequence and wherein the second pattern matches at least one portion of the first pattern;

containing the ingestible product with the packaging; and identifying the ingestible product as being a genuine ingestible product by confirming, via a human readable visual comparison, that the second pattern on the ingestible product matches the at least one portion of the first pattern on the packaging.

2. The method of claim 1 wherein the applying the first pattern and applying the second pattern comprises:

printing the respective identifiers onto the packaging to apply the first pattern and printing the respective sub-set of identifiers onto the ingestible product to apply the second pattern.

3. The method of claim 1, wherein applying the second pattern directly to the ingestible product comprises:

printing the sub-set of color bar identifiers of the second pattern on the ingestible product in a same size and position relationship to one another as the color bar identifiers of the first pattern on the packaging; and after removing the ingestible product from the packaging, physically moving the ingestible product into proximity relative to the packaging to cause a one-to-one alignment between the second pattern of the color bar identifiers on the ingestible product and the first pattern of color bar identifiers on the packaging, wherein identifying the ingestible product as a genuine ingestible product includes confirming a human readable, visual one-to-one matching of the second pattern of color identifiers on the ingestible product relative to the at least one portion of the first pattern of color identifiers on the packaging.

4. The method of claim 1, wherein the code comprises both the different color bar identifiers and alphanumeric identifiers, wherein the respective identifiers comprise at least two different types of family identifiers that are applied to each of the packaging and the ingestible product.

5. The method as claimed in claim 1, comprising:
providing the ingestible product, as contained within the packaging, as a pharmaceutical product in the form of at least one of a tablet or a capsule;
removing the ingestible product from the packaging; and
performing the human readable visual comparison of the second pattern on the ingestible product with the first pattern on the packaging to verify the second pattern matches the at least one portion of the first pattern.

6. A method of identifying a product, the method comprising:
generating a code unique to the product, the code being provided by a multitude of individual identifiers;
applying a first pattern to a packaging, wherein the first pattern comprises the multitude of the identifiers of the code;
recording the first pattern of the multitude of the identifiers of the code in a catalogue and maintaining that catalogue for access;
applying a second pattern directly to the product, wherein the second pattern comprises a sub-set of two or more of the respective identifiers and wherein the second pattern matches at least one portion of the first pattern;
containing the product with the packaging;
identifying the product as being a genuine product by confirming, via a human readable visual comparison, that the second pattern on the product matches the at least one portion of the first pattern on the packaging; and
permitting access to the catalogue to enable a user to confirm, via a human readable visual comparison, that the first pattern on the packaging matches the first pattern in the catalogue for that product and thereby confirm that both the first pattern on the packaging and the second pattern on the product is a correct pattern of the code for the product.

7. The method of claim 6, further comprising:
maintaining the catalogue at an electronically accessible site.

8. The method of claim 6, wherein the product comprises an ingestible, pharmaceutical product.

9. A method of identifying a product comprising:
generating a code unique to the product, the code being provided by a multitude of individual identifiers;
providing a first pattern of respective identifiers in a catalogue and providing electronic access to the catalogue;
applying the multitude of the identifiers of the code to a packaging in the first pattern;
applying a sub-set of two or more of the respective identifiers directly onto the product as a second pattern that matches at least one portion of the first pattern of the respective identifiers applied to the packaging;
containing the product relative to the packaging;
electronically reading, via a scanner, each of the first pattern on the packaging and the second pattern on the product;
identifying the product as being a genuine product by confirming, via an electronic comparison of the electronically read first and second patterns, that the second pattern applied to the product matches the at least one portion of the first pattern applied to the packaging; and
electronically accessing the catalogue to enable a user to electronically confirm that the first pattern on the packaging and that the second pattern on the product matches the first pattern recorded in the catalogue, wherein such electronic confirmation affirms that the electronically read second pattern is a sub-set of the code defining the electronically read first pattern.

10. The method of claim 9, comprising:
performing the electronic comparison via a computer device in communication with the scanner and programmed with software to enable determining whether the respective electronically read first and second patterns match each other.

11. The method of claim 9, including:
storing each attempt to compare the second pattern on the product with the first pattern in the catalogue;
upon each attempt to compare, determining whether the same respective first and second patterns have previously been compared; and
informing a user of the prior comparison.

12. The method of claim 9, wherein the product comprises an ingestible, pharmaceutical product.

13. A package comprising:
the package containing a product, with the package including a code applied onto the package as a first pattern of a multitude of unique identifiers, wherein the code is unique to the product;
the product including a second pattern applied directly onto the product, wherein the second pattern comprises a sub-set of two or more of the multitude of identifiers of the code and wherein the second pattern on the product matches at least one portion of the first pattern on the package, wherein the product has a physical size insufficient to carry all the identifiers of the first pattern on the product in the same size and positioning pattern relationship as the identifiers of the first pattern on the package; and
wherein the respective first and second patterns are configured to enable determining a genuineness of the product by confirming, via a human readable visual comparison, that the second pattern on the product matches the at least one portion of the first pattern on the package.

14. The package of claim 13 wherein the identifiers of the first pattern and of the second pattern are applied as printed identifiers and the identifiers of the second pattern have the same size, the same uniform spacing, and the same positioning pattern as the identifiers of the first pattern.

15. The package of claim 13 wherein the identifiers of the first pattern and of the second pattern comprise different color bar identifiers and alphanumeric identifiers.

16. The package of claim 15 wherein the first pattern and the second pattern includes the alphanumeric identifiers extending in a row above or below the different color bar identifiers, with the respective alphanumeric identifiers aligned in one-to-one correspondence with the respective different color bar identifiers and wherein a sequence of the color bar identifiers is arranged such that each successive bar identifier in the sequence is a different color than an immediately preceding color bar identifier.

17. The package of claim 13 wherein the product comprises two or more products contained separately within different portions of the package and wherein each of the two or more products have a different respective sub-set of the multitude of identifiers expressed as different second patterns of the identifiers, and wherein each of the respective different second patterns match at least one portion of the first pattern, and wherein the identifiers of each different second pattern on the respective separate two or more products have generally the same size and positioning pattern relationship to one another and relative to the identifiers of the first pattern on the package.

18. The package of claim 13 wherein the product comprises at least one of a pharmaceutical tablet or a pharmaceutical capsule.

19. A pharmaceutical assembly comprising:

two or more ingestible pharmaceutical products;

a package containing the respective pharmaceutical products, the package including a printed code defining a first pattern of a multitude of unique identifiers, wherein the code is unique to the respective pharmaceutical products and wherein the product has a physical size insufficient to carry all the identifiers of the first pattern on the pharmaceutical product in the same size and positioning pattern relationship as the identifiers of the first pattern on the package;

two or more different second printed patterns with each respective different second pattern printed on a respective one of the two or more pharmaceutical products, each respective different second pattern corresponding to a different respective sub-set of two or more of the multitude of identifiers of the code, wherein each of the respective different second patterns match a corresponding different portion of the first pattern on the package, and wherein the identifiers of each of the different second patterns on the respective separate two or more pharmaceutical products have generally the same size and positioning pattern relationship to one another and relative to the identifiers of the first pattern on the package; and wherein the respective first and different second patterns are configured to enable determining that a genuineness of the respective pharmaceutical products by confirming, via a human readable visual comparison, that the different second pattern on each of the respective pharmaceutical products matches one of the respective different portions of the first pattern on the package.

20. The pharmaceutical assembly of claim 19 wherein the two or more products are contained separately from each other in the package.

21. The pharmaceutical assembly of claim 19 wherein each respective sub-set defining one of the different second patterns comprises four or more of the multitude of identifiers of the code.

22. The pharmaceutical assembly of claim 19 wherein the two or more products comprises four or more products contained separately from each other in the package, wherein the two or more different second patterns comprises four or more different second patterns, wherein the identifiers of each of the different second patterns on the respective separate four or more pharmaceutical products have generally the same size and positioning pattern relationship to one another and relative to the identifiers of the first pattern on the package.

23. A pharmaceutical assembly comprising:

a package containing an ingestible pharmaceutical product, with the package including a code applied onto the package as a first pattern of a multitude of unique color bar identifiers, wherein the code is unique to the ingestible pharmaceutical product;

the ingestible pharmaceutical product including a second pattern applied directly onto the ingestible pharmaceutical product, wherein the second pattern comprises a sub-set of two or more of the multitude of color bar identifiers of the code and wherein the second pattern on the ingestible pharmaceutical product matches at least one portion of the first pattern on the package; and wherein the respective first and second patterns are configured to enable determining a genuineness of the product by confirming, via a human readable visual comparison, that the second pattern on the product matches the at least one portion of the first pattern on the package.

24. The pharmaceutical assembly of claim 23, wherein the ingestible pharmaceutical product has a physical size insufficient to carry all the identifiers of the first pattern on the ingestible pharmaceutical product in the same size and positioning pattern relationship as the identifiers of the first pattern on the package.

25. The pharmaceutical assembly of claim 24, wherein the physical size of the ingestible pharmaceutical product is configured to enable a plurality of the ingestible pharmaceutical products to be contained within a pharmaceutical bottle.

26. The pharmaceutical assembly of claim 24, wherein, upon removal of the ingestible pharmaceutical product from the package, the first pattern on the package and the second pattern on the ingestible pharmaceutical package are configured to perform the human readable visual comparison via a one-to-one alignment between the second pattern on the ingestible pharmaceutical product and at least one portion of the first pattern on the package.

* * * * *